(12) United States Patent
Hang et al.

(10) Patent No.: US 10,366,353 B2
(45) Date of Patent: Jul. 30, 2019

(54) TRAVEL SEARCH MACHINE WITH SHAREABLE TRIP OBJECTS

(71) Applicant: Hipmunk, Inc., San Francisco, CA (US)

(72) Inventors: Nancy Tu Hang, San Francisco, CA (US); Steven Ladd Huffman, San Francisco, CA (US); Lauren Porter, San Francisco, CA (US); Phillip Aquilina, Millbrae, CA (US); Niranjan Ramadas, San Francisco, CA (US)

(73) Assignee: Hipmunk, Inc., San Francisco, CA (US)

( * ) Notice: Subject to any disclaimer, the term of this patent is extended or adjusted under 35 U.S.C. 154(b) by 682 days.

(21) Appl. No.: 14/632,402

(22) Filed: Feb. 26, 2015

(65) Prior Publication Data

US 2016/0253600 A1   Sep. 1, 2016

(51) Int. Cl.
   *G06Q 10/02*   (2012.01)
   *G06Q 50/14*   (2012.01)

(52) U.S. Cl.
   CPC ............. *G06Q 10/02* (2013.01); *G06Q 50/14* (2013.01)

(58) Field of Classification Search
   None
   See application file for complete search history.

(56) References Cited

U.S. PATENT DOCUMENTS

| | | | |
|---|---|---|---|
| 8,768,932 B1* | 7/2014 | Kacholia | G06F 17/30864 707/705 |
| 2007/0073562 A1* | 3/2007 | Brice | G06Q 10/02 705/5 |
| 2010/0063721 A1* | 3/2010 | Won | G01C 21/343 701/533 |
| 2012/0089641 A1* | 4/2012 | Wilde | G06F 16/3338 707/771 |
| 2013/0036139 A1* | 2/2013 | Kung | G06Q 10/025 707/780 |
| 2013/0046559 A1* | 2/2013 | Coleman | G06Q 10/10 705/4 |
| 2014/0195525 A1* | 7/2014 | English | G06F 16/951 707/722 |

* cited by examiner

*Primary Examiner* — Paul Danneman
(74) *Attorney, Agent, or Firm* — Schwegman Lundberg & Woessner, P.A.

(57) ABSTRACT

A travel search machine generates a trip object defined by a corresponding trip identifier. The trip object may have a corresponding trip data structure to which one or more search results may be assigned by a user. For example, the travel search machine may be configured to receive a trip identifier as a submission from a user device, generate a trip data structure corresponding to the trip identifier, and responsive to a received command from a user device, assign one or more search results to the trip data structure, such that reference to the trip data structure via the received trip identifier causes a presentation of at least some of the one or more search results assigned to the trip data structure.

18 Claims, 10 Drawing Sheets

US 10,366,353 B2

TRAVEL SEARCH MACHINE WITH SHAREABLE TRIP OBJECTS

TECHNICAL FIELD

The subject matter disclosed herein generally relates to machines configured to process data. Specifically, the present disclosure addresses machines and methods to facilitate presenting and sharing search results.

BACKGROUND

Websites have enabled users to search for a variety of products and services. Some allow a user to purchase or reserve a selected product or service. More specifically, in the travel industry, a number of websites enable a user to search for and make reservations and bookings. To book flights, for example, an airline may have a website that a user can use to search for fares and purchase tickets. Concurrently, metasearch sites exist which combine travel options from several online travel agents, and airlines, giving the user a greater selection than may be obtained from a single airline.

A user may operate a machine (e.g., a device) to execute a search of one or more databases and obtain corresponding search results from the executed search. Accordingly, a travel website may operate a machine (e.g., a travel search machine) that provides one or more travel search services to one or more devices belonging to a plurality of users. The travel search machine may be configured (e.g., by suitable software executing on a processor of the travel search machine) to receive a search request containing search criteria, and retrieve search results from a database, and cause a device of the user to present search results. For example, the device of the user may execute an application, and the travel search machine may cause the application to present the search results. In various example embodiments, the application may be a multi-purpose application (e.g., a web browser operable to interact with any of various web pages) or a single-purpose application (e.g., a dedicated mobile app or applet operable to interact with a single web site). The travel search machine may be or include a group of one or more server machines configured to provide one or more search engine services. In executing the application, the device may accordingly request and receive, from the search engine, a set of one or more search results based on the submitted search criteria. The application may then cause the device to present at least some of the received search results within a user interface.

BRIEF DESCRIPTION OF THE DRAWINGS

Some embodiments are illustrated by way of example and not limitation in the figures of the accompanying drawings.

DETAILED DESCRIPTION

Figure 1:
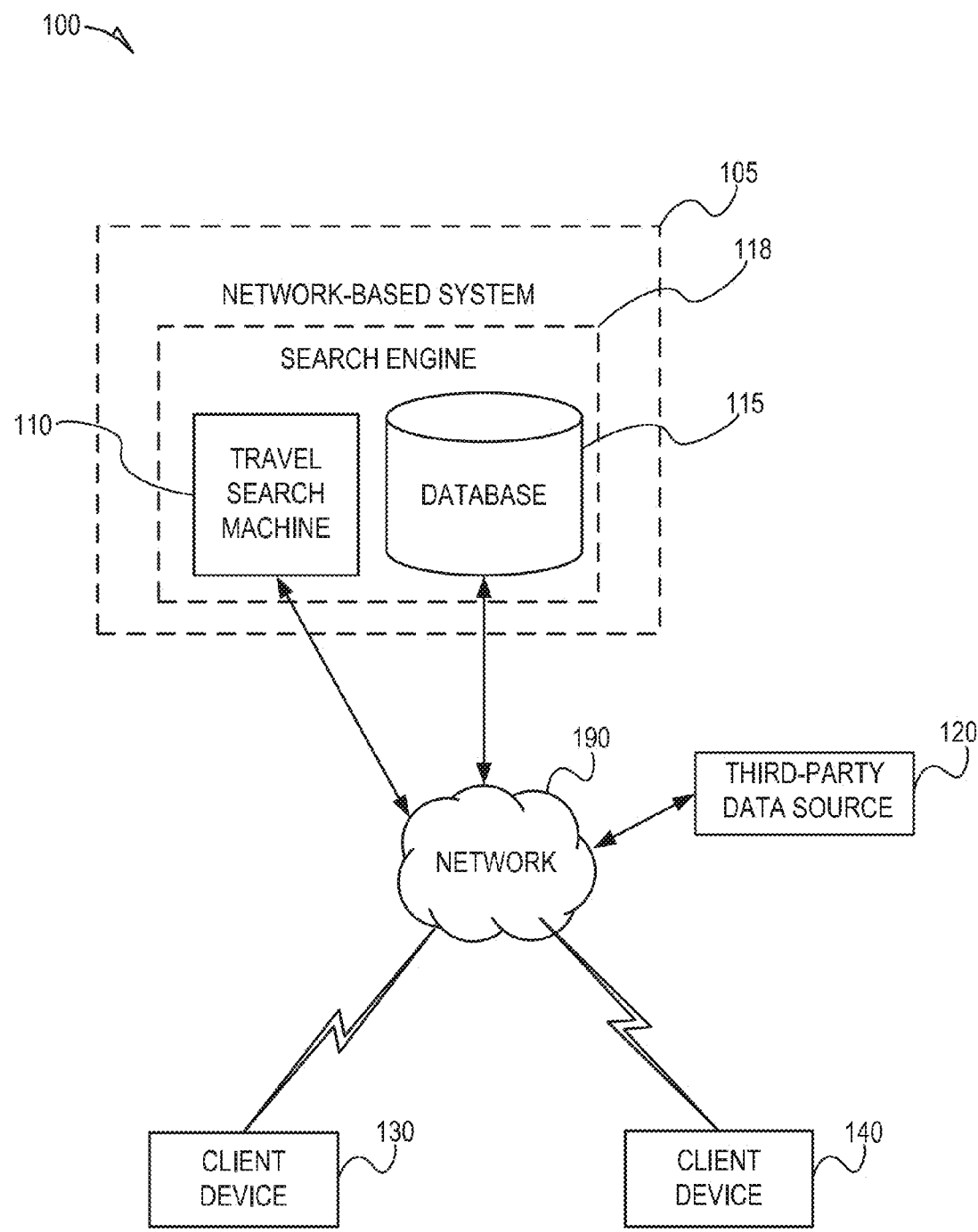
FIG. 1 is a network diagram illustrating a network environment suitable for presenting and sharing search results as trip objects, according to some example embodiments.

Example embodiments described herein pertain to a travel search machine (e.g., in an online search environment), configured to retrieve and assign search results to user-selected trip objects (e.g., shareable trip objects), and further configured to enable a user to share the trip objects with one or more additional users. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The travel search machine is configured (e.g., by one or more suitable modules that include one or more processors) to generate a shareable trip object that is defined by a corresponding trip identifier. Within the context of computing systems, an object may be defined as a location in memory, where the object has a corresponding value and possibly an identifier. An object can be a variable, a data structure, a function, or a combination thereof. As discussed in this specification, a trip object represents a presentation of one or more search results corresponding to one or more trip criteria, and further including a trip identifier. Sharing of the trip object enables users to view, rate, and comment on one or more search results corresponding to a trip, and further facilitate user collaboration to plan the trip. The trip object may have a corresponding trip data structure to which one or more sets of search results may be assigned (e.g., by a user). In generating the shareable trip object, the travel search machine may obtain the trip identifier as a user submission retrieved through a trip creation interface presented by the device of the user.

In addition, the travel search machine is also configured to retrieve search results based on user-provided search criteria. For example, a user may interact with the travel search machine through a travel-search interface (e.g., a graphical user interface configured to search and present travel options) on a user device, where the user may execute a travel-search by entering one or more search criteria into the travel-search interface, the search criteria identifying one or more travel options which may include a desired travel option. In response, the travel search machine retrieves and presents corresponding search results as a list. For example, the list may include: (i) details of a product or service offered, (ii) a provider of the product or service, (iii) a corresponding price of the product or service, or any suitable combination thereof. The travel search machine may further enable the user to apply one or more selections, filters, sorts, comments, or suitable combination thereof to the retrieved search results. The travel search machine may then receive a command to assign the one or more search results to the received trip identifier. In some example embodiments the one or more search results may be assigned to multiple trip identifiers. The command may be received directly or indirectly from the user device. In response to the command, the travel search machine links the one or more search results to the trip identifier. Linking the one or more search results to the trip identifier creates a semantically linked relationship between the two items, such that a reference to the trip identifier may retrieve the one or more search results, and vice versa.

The travel search machine may then generate and cause the display of a presentation of the trip data structure identified by the trip identifier. The generated presentation may include at least some of the one or more search results linked to the trip identifier. Thereafter, the user can share the trip object corresponding to the trip data structure with a second user, and the travel search machine will cause the presentation of at least some of the one or more search results on a second device of the second user, for viewing by the second user. In some example embodiments, the travel search machine may also receive comments and ratings corresponding to the one or more search results as submissions from one or more user devices of users viewing the search results.

As an illustrative example from a user perspective, suppose a user named Dale launches a mobile app on his smartphone, and the mobile app allows Dale to access the travel search machine in order to organize a future ski trip with a small group of friends. Dale may first provide the travel search machine with a trip identifier, naming the trip, for example, "Ski Trip." The travel search machine may then generate a trip data structure identified by the trip identifier, "Ski Trip." Now, Dale can provide one or more search criteria which identify parameters surrounding his ski trip, including travel dates, locations, and a price range. For example, Dale may first search for hotel options in Lake Tahoe, Calif., on the first weekend of February. In response, the travel search machine provides Dale with a listing of hotel options as results, matching his search criteria. Dale may then narrow the hotel search results further by adding further criteria, such as including a maximum price he is willing to spend on the hotel per night. Once Dale is satisfied with the range of options provided in the hotel search results, Dale may command that the travel search machine link the hotel search results to the trip identifier he provided. Responsive to receiving the command, the travel search machine may then link the hotel search results to the trip data structure with the trip identifier, "Ski Trip."

Dale may now recall his prior search results by returning to the travel search machine and accessing the trip data structure identified by the trip identifier, "Ski Trip." Alternatively, Dale may also choose to add additional search results to the trip data structure. For example, Dale may now decide to search for travel options. In the same manner that he previously searched for hotel options through the search interface, Dale may now search for travel options. Once Dale is satisfied with the range of travel options provided in his travel search, Dale may again command the travel search machine to link the travel search results to the trip data structure identified by the trip identifier, "Ski Trip." Again, responsive to the received command, the travel search machine links the travel search results to the trip data structure with the trip identifier, "Ski Trip." In this way, Dale may add multiple search results with various different search criteria to the trip data structure.

A little later, Dale decides that it's time to share his findings with the small group of friends who will be traveling with him. Dale then launches a web browser to access the travel search machine, and accesses the trip data structure, "Ski Trip." To enable Dale to share the trip data structure, the travel search machine may, for example, include a "Share Trip" icon. By accessing the "Share Trip" icon, a graphic user interface enabled to receive contact information (e.g., a user name or email address) associated with one or more additional users is presented. Dale may then provide the travel search machine with correspondence information, such as email addresses, of the friends who he would like to share the trip data structure with. Once Dale has provided email addresses for everyone he'd like to share the trip data structure with, the travel search machine may deliver a link to the trip data structure to each of the provided email addresses, such that accessing the link generates a presentation of the one or more search results corresponding to the trip data structure identified by the trip identifier, "Ski Trip."

Upon receiving an access link to the trip data structure, Dale's friends may provide comments on options in the search results, rate the search results, and in some embodiments add search results to the trip data structure themselves. Thus, Dale can organize the trip, and collaborate with his small group of friends through generating and sharing the trip data structure.

FIG. 1 is a network diagram illustrating a network environment 100 suitable for operating a travel search machine 110, according to some example embodiments. The network environment 100 includes the travel search machine 110, a database 115, a third-party data source 120, and client devices 130 and 140, all communicatively coupled to each other via a network 190. The travel search machine 110, with or without the database 115, may form all or part of a search engine 118 (e.g., a travel search engine, a hotel search engine, a shopping search engine, a news search engine, or any suitable combination thereof). In addition, the search engine 118 may form all or part of a network-based system 105 (e.g., a cloud-based server system configured to provide one or more services, such as search engine services, to the client devices 130 and 140). The third-party data source 120 may be or include a database (e.g., similar to database 115). In some example embodiments, the third-party data source 120 is a web server machine operated by a third-party (e.g., a business entity distinct from the business entity that operates the travel search machine 110). The travel search machine 110, the database 115, the third-party data source 120, and the client devices 130 and 140 may each be implemented in a computer system, in whole or in part, as described below with respect to FIG. 10.

Any of the machines, databases 115, or devices shown in FIG. 1 may be implemented in a special-purpose computer that has been modified (e.g., configured or programmed) by software (e.g., one or more software modules) to perform one or more of the functions described herein for that machine, database 115, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases 115, or devices illustrated in FIG. 1 may be combined into a single machine, and the functions described herein for any single machine, database 115, or device may be subdivided among multiple machines, databases 115, or devices.

The network 190 may be any network that enables communication between or among machines, databases 115, and devices (e.g., the travel search machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
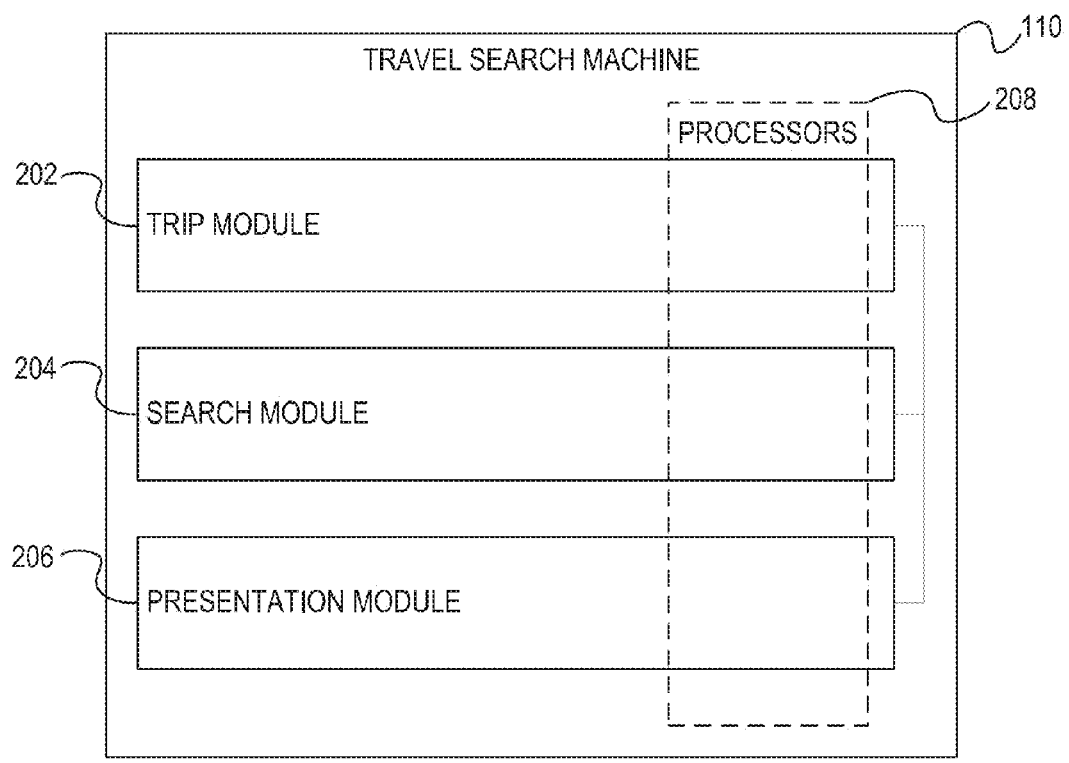
FIG. 2 is a block diagram illustrating components of a travel search machine suitable for presenting and sharing search results as trip objects, according to some example embodiments.

FIG. 2 is a block diagram illustrating components of the travel search machine 110 that configure the travel search machine 110 to generate trip objects, retrieve search results, assign search results to trip objects, and cause the presentation of the search results, according to some example embodiments. The travel search machine 110 is shown as including a trip module 202, a search module 204, and a presentation module 206, all configured to communicate with each other (e.g., via a bus, shared memory, or a switch). Any one or more of these modules may be implemented using one or more processors 208 and hence may include one or more of the processors 208 (e.g., by configuring such one or more processors 208 to perform functions described for that module).

Any one or more of the modules described may be implemented using hardware alone (e.g., one or more of the processors 208 of a machine) or a combination of hardware and software. For example, any module described of the travel search machine 110 may physically include an arrangement of one or more of the processors 208 (e.g., a subset of or among the one or more processors of the machine) configured to perform the operations described herein for that module. As another example, any module of the travel search machine 110 may include software, hardware, or both, that configure an arrangement of one or more processors 208 (e.g., among the one or more processors of the machine) to perform the operations described herein for that module. Accordingly, different modules of the travel search machine 110 may include and configure different arrangements of such processors 208 or a single arrangement of such processors 208 as different points in time. Moreover, any two or more modules of the travel search machine 110 may be combined into a single module, and the functions described herein for a single module may be subdivided among multiple modules. Furthermore, according to various example embodiments, modules described herein as being implemented within a single machine, database 115, or device may be distributed across multiple machines, databases 115, or devices.

Figure 3:
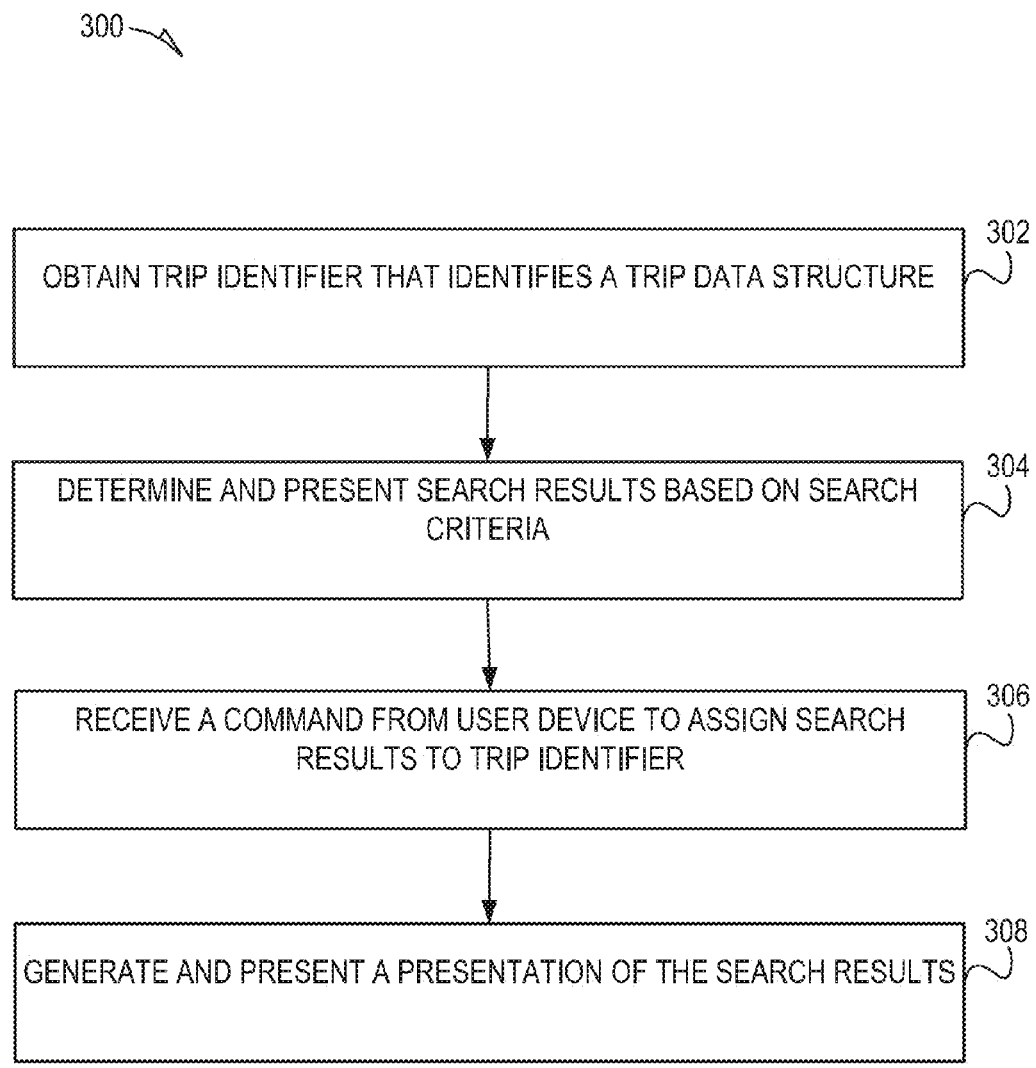
FIG. 3 is a flowchart illustrating operations of the travel search machine in performing a method of generating and presenting search results as trip objects, according to some example embodiments.

FIG. 3 is a flowchart illustrating operations of the travel search machine 110 in performing a method 300 of obtaining trip identifiers for generating trip objects, assigning search results to the trip objects, and presenting the search results, according to various example embodiments. Operations of the method 300 may be performed by the modules described above with respect to FIG. 2. As shown in FIG. 3, the method 300 includes operations 302, 304, 306, and 308.

In operation 302, the trip module 202 obtains the trip identifier that identifies a trip data structure. In some example embodiments, the trip module 202 receives the trip identifier as a submission (e.g., a text submission) from a client device 130. According to various example embodiments, a user may provide the trip identifier through a text input field within a trip creation interface presented on the client device 130, or in some embodiments as a selection of a trip identifier from among a listing of previously obtained trip identifiers. The trip identifier may include words or phrases provided by the user, as well as icons which may be useable to specify a trip identifier. After receiving the trip identifier, the trip module 202 generates a trip object with a corresponding trip data structure, and assigns the trip identifier to the trip data structure.

In operation 304, the search module 204 receives one or more search criteria submitted by the user. The search module 204 may then determine and retrieve search results based on at least some of the search criteria submitted by the user. This may be performed by searching the database 115 for the search results (e.g., an airline flight or hotel accommodations), selecting the search results based on at least some of the search criteria submitted by the user, and retrieving and providing the search results to client device 130 through presentation module 206. The search results may also include a corresponding search data structure.

In some example embodiments, the one or more search criteria may be or include a keyword submitted by the user as a text-based search in a search field within the trip creation interface. In other example embodiments, the one or more search criteria may be retrieved through geolocation of the device 130, predefined preferences of the user, or as one or more selections of selectable search criteria options presented in a search criteria menu (e.g., a selectable list of: hotels, hotel locations, hotel room rates, airlines, departure cities, arrival cities, departure times, arrival times, and price options). Accordingly, a user device may include a global positioning system (GPS) receiver (e.g., location component 1014, discussed below with respect to FIG. 10) which the search module 204 may be configured to access and to retrieve location information corresponding to the user device. The location information may be used by the search module 204 to identify, for example, nearby airports or hotels. Additionally, the user may have an associated user profile, in which the user may identify one or more predefined preferences, such as a preferred airport, a list of preferred airlines, and a list of preferred hotels to choose from. The search module may then present search results, based on the one or more predefined preferences, thus enabling a user to personalize search results.

In operation 306, the trip module 202 receives a command from the client device 130 to assign one or more of the search results presented by the presentation module 206 (e.g., some or all of the search results provided in operation 304) to the received trip identifier. In some example embodiments, this may be performed by the trip module 202 generating a reference that identifies the trip data structure identified by the trip identifier, and providing the reference to the search module 204 in order to store the reference within the search data structure corresponding to the search results. In alternative example embodiments, the search module 204 generates a reference that identifies the search data structure corresponding to the one or more search results obtained based on the submitted search criteria, and may provide the reference to the trip module 202 in order to store the reference with the trip data structure identified by the trip identifier.

In operation 308, the presentation module 206 generates and causes the display of a presentation of search results assigned to the trip data structure identified by the trip identifier. The search results may include all or some of the search results retrieved by the search module 204, in addition to one or more search results previously assigned to the trip data structure identified by the trip identifier. In some example embodiments, the presentation may include the trip identifier received by the trip module 202 presented with a list including search results retrieved by the trip module 202, and assigned to the trip data structure identified by the trip identifier.

Figure 4:
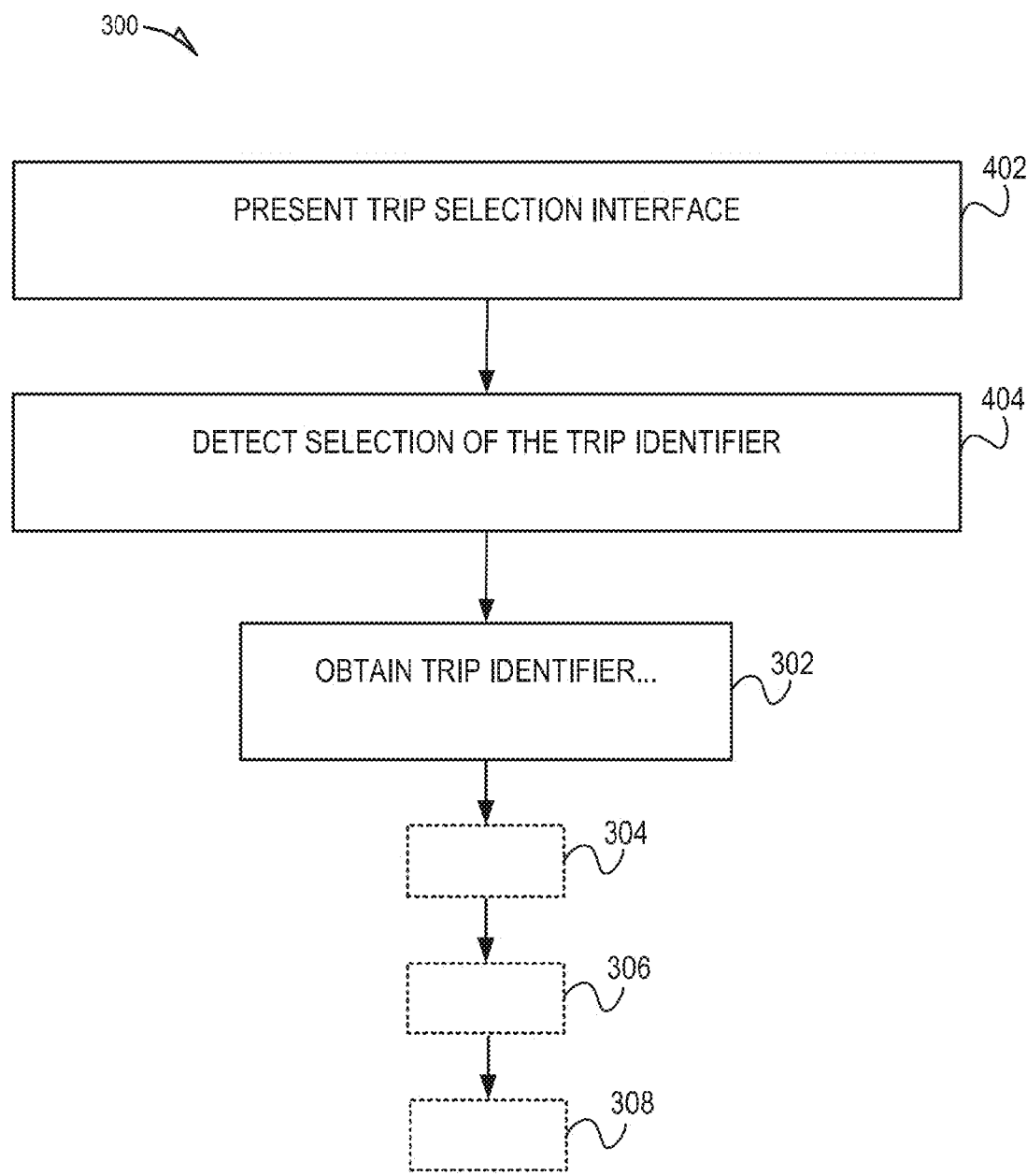
FIG. 4 is a flowchart illustrating operations of the travel search machine in performing a method of obtaining a trip identifier as a submission from a user device, according to some example embodiments.

As shown in FIG. 4, one or more operations 402 and 404 may be performed as part (e.g., a precursor task, a subroutine, or portion) of operation 302 of method 300, in which the trip module 202 obtains a trip identifier, generate a trip data structure, and assigns the trip identifier to the trip data structure.

Operation 402 may be performed by the presentation module 206, with respect to the client device 130. In some example situations, a user accessing the trip creation interface of the travel search machine 110 is presented with a trip selection interface by the presentation module 206. The trip selection interface may include a text input field, a list of one or more previously obtained trip identifiers that each correspond to a different trip data structure, or both.

Operation 404 may be performed by the trip module 202, in relation to the client device 130. Upon being presented with the trip selection interface by the presentation module 206, the user may select or submit a trip identifier. In some example embodiments, the user may provide the trip identifier as a text or spoken submission into a text field within the trip selection interface. In other example embodiments, the trip module 202 may present the user with a list of trip identifiers including one or more pre-defined trip identifiers, previously obtained from the user or one or more additional users in creating other trips. The user may select a trip identifier from among the list of trip identifiers.

Figure 5:
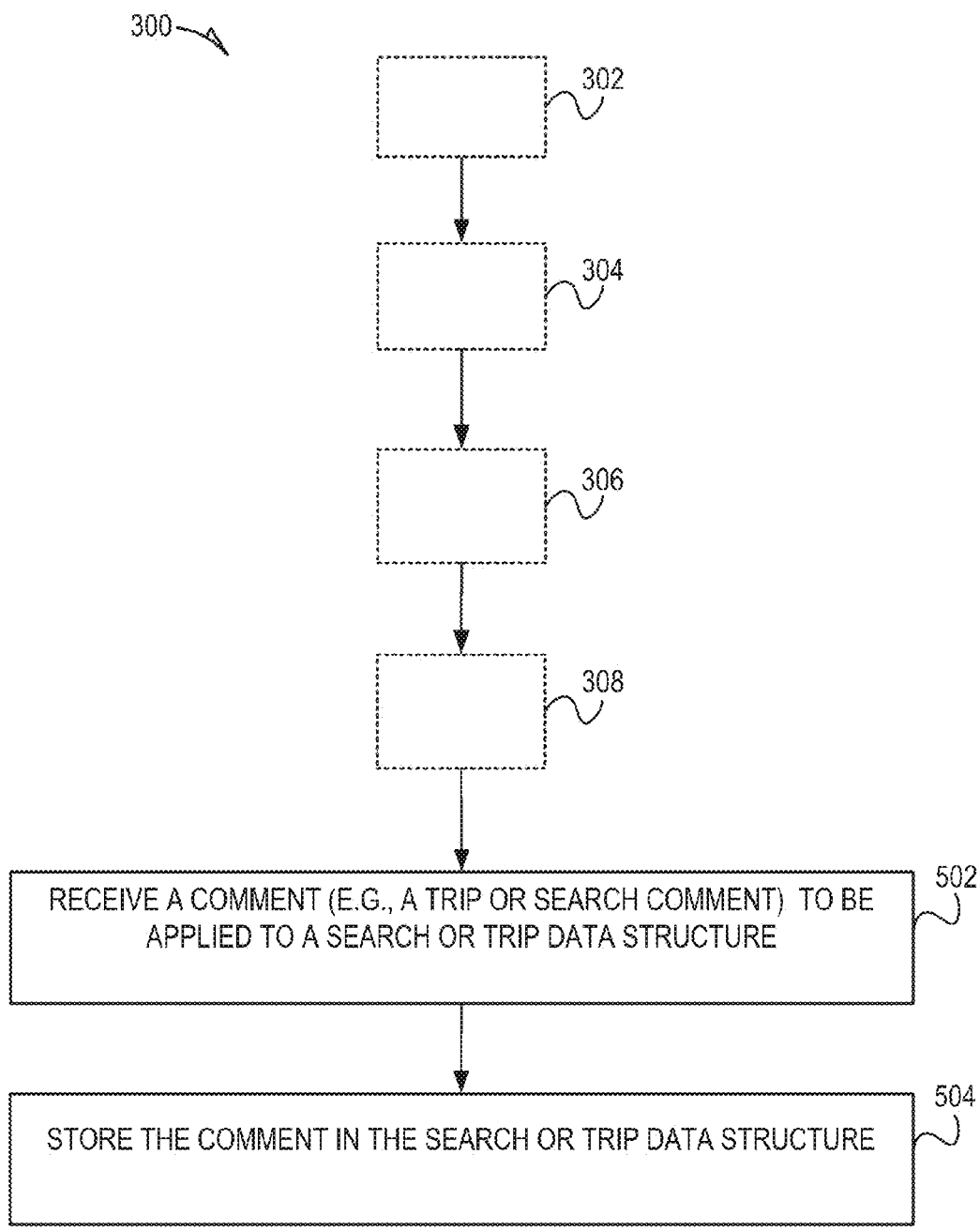
FIG. 5 is a flowchart illustrating operations of the travel search machine in performing a method of obtaining a comment to be applied to a search or trip data structure, according to some example embodiments.

As shown in FIG. 5, one or more of operations 502 and 504 may be performed as part (e.g., a precursor task, a subroutine, or portion) of method 300. Operation 502 may be performed by the presentation module 206, in relation to the client device 130. In operation 308 of method 300, the presentation module 206 generates and presents a presentation (e.g., a list, an array, etc.) of search results assigned to a trip data structure identified by a trip identifier. The presentation of search results generated by the presentation module 206 may further include a comment field (e.g., a text input field) enabling the user to submit comments to be applied to the search data structure corresponding to the presented search results, or to the trip data structure identified by the trip identifier. For example, the presentation module 206 may cause the display of the presentation on the client device 130, where the presentation includes the one or more search results corresponding to the selected or submitted trip identifier. The user may choose to submit a comment to be applied to either the search data structure or trip data structure through the comment interface. The comment may include a text string, a uniform resource locator (URL), an image, or a video.

Operation 504 may be performed by the trip module 202 or the search module 204, in relation to client device 130. Upon receiving the comment submitted by the user through the comment interface presented by the presentation module 206, the comment is stored in the corresponding trip data structure or search data structure by the trip module 202 or the search module 204. In storing the comment to the corresponding search or trip data structure, the comment may then be presented by the presentation module 206 along with the trip data structure identified by its corresponding trip identifier, or with the search data structure and its corresponding search results.

For example, from the perspective of a user accessing the travel search machine 110 through client device 130, the user may select a trip identifier from among a list of previously obtained trip identifiers, as in operation 402. Responsive to selecting a trip identifier, the trip module 202 may retrieve the corresponding trip data structure along with any corresponding applied comments, and the search module 204 may retrieve the search results and corresponding search data structure assigned to the selected trip identifier, along with any corresponding comments applied to the search data structure. The presentation module 206 may then generate and cause the presentation of the search results corresponding to the trip data structure identified by the selected trip identifier, and in addition, may also present any comments which had previously been applied. The comments may also include a user identifier corresponding to a user who applied the comment, as well as a time and date stamp corresponding to a time and date when the comment was applied.

Figure 6:
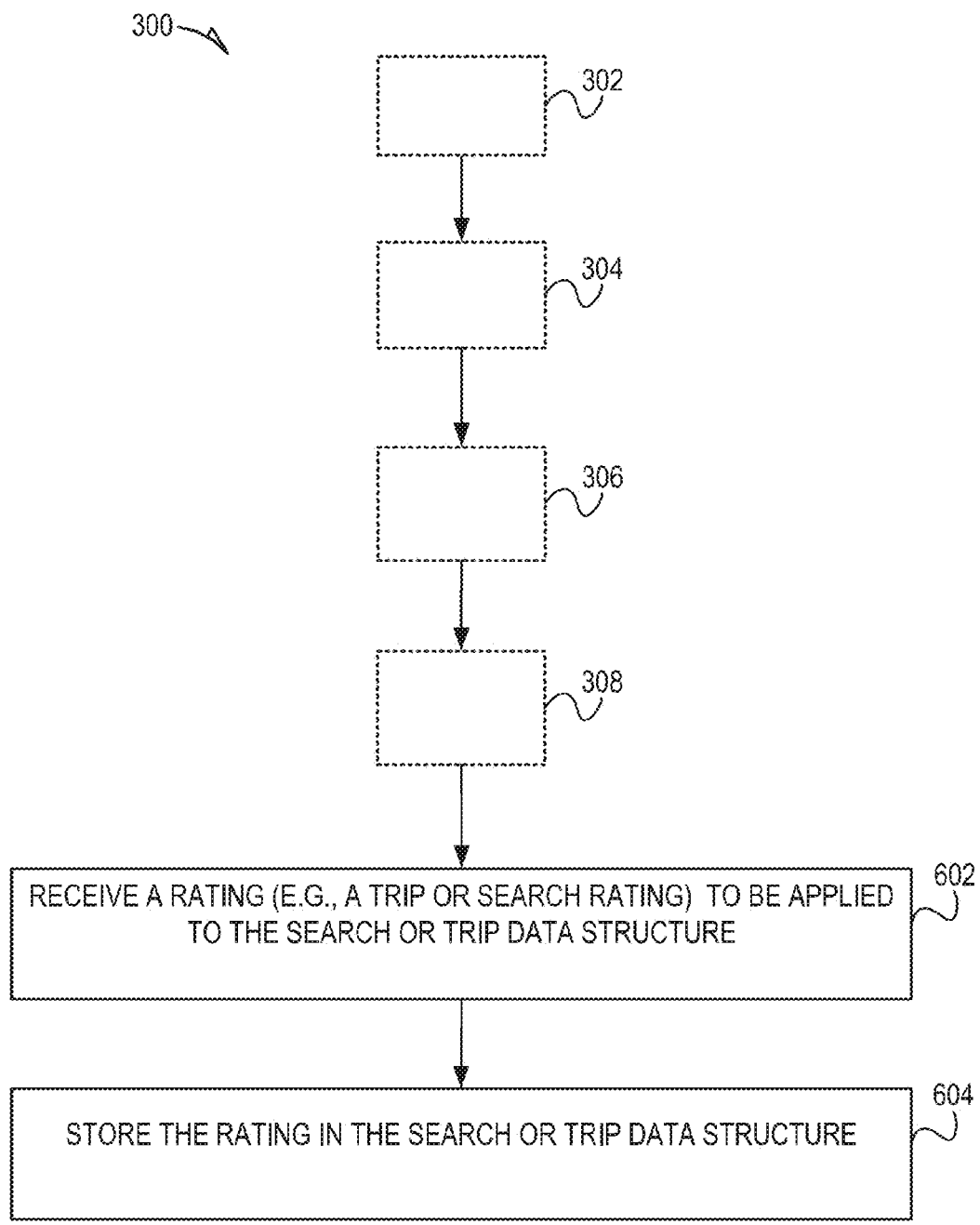
FIG. 6 is a flowchart illustrating operations of the travel search machine in performing a method of obtaining a rating to be applied to a search or trip data structure, according to some example embodiments.

As shown in FIG. 6, one or more operations 602 and 604 may be performed as part (e.g., a precursor task, a subroutine, or portion) of method 300. Operation 602 may be performed by the presentation module 206, with respect to client device 130. At operation 308 of method 300, the presentation module 206 generates and presents a presentation of search results assigned to a trip data structure identified by a trip identifier. The presentation of search results generated by the presentation module 206 may further include a rating interface (e.g., a like button, a dislike button, a voting mechanism, or a numerical score) enabling the user to submit a rating to be applied to the search data structure corresponding to the presented search results, or to the trip data structure identified by the trip identifier. For example, the presentation module 206 may cause the display of the presentation of the one or more search results corresponding to the selected or submitted trip identifier on the user device 130. The user may choose to submit a rating to be applied to either the search data structure or trip data structure through the comment interface. In some embodiments, the ratings received from users corresponding to a particular search or data structure may be combined (e.g., averaged, or have the median taken) and presented as a single rating with the search or data structure.

Operation 604 may be performed by the trip module 202 or the search module 204, with respect to client device 130. Upon receiving the rating submitted by the user through the rating interface presented by the presentation module 206, the rating is stored in the corresponding trip data structure or search data structure by the trip module 202 or the search module 204. In storing the rating to the corresponding search or trip data structure, the rating may then be presented by the presentation module 206 along with the trip data structure identified by its corresponding trip identifier, or with the search data structure and its corresponding search results.

For example, from the perspective of a user accessing the travel search machine 110 through client device 130, the user may select a trip identifier from among a list of previously obtained trip identifiers, as in operation 402. Responsive to selecting a trip identifier, the trip module 202 may retrieve the corresponding trip data structure along with any corresponding applied comments, and the search module 204 may retrieve the search results and corresponding search data structure assigned to the selected trip identifier, along with any corresponding ratings previously applied to the search data structure. The presentation module 206 may then generate and cause the presentation of the search results corresponding to the trip data structure identified by the selected trip identifier, and in addition, may also present any ratings which had previously been applied. In some embodiments the ratings may be presented as a numerical score calculated based on a total number of rating submissions received from the rating interface of the corresponding search or trip data structure.

Figure 7:
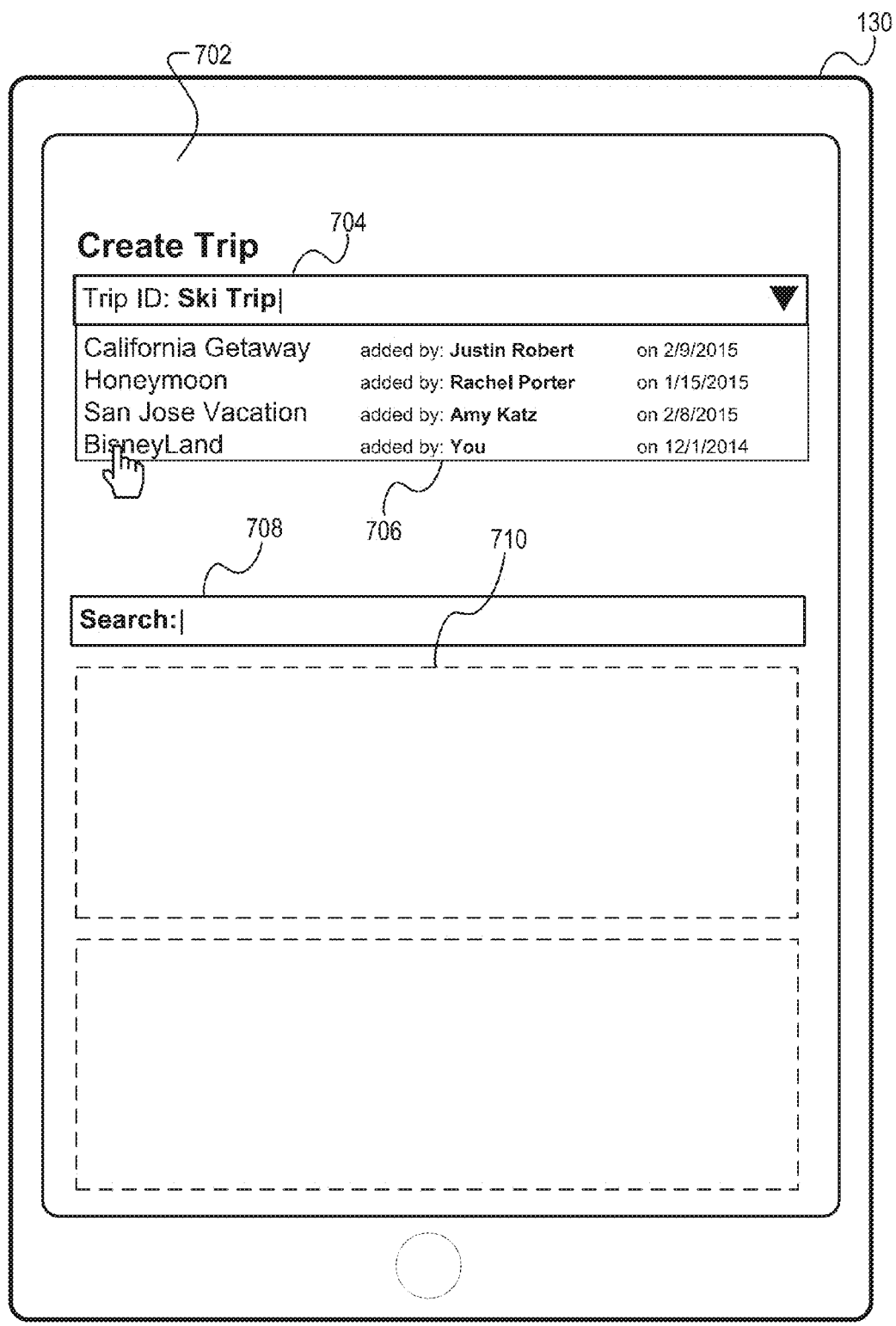
FIG. 7 is a diagram illustrating a trip creation interface including one or more trip identifiers, according to some example embodiments.

FIG. 7 is a diagram of a graphical user interface (GUI) (e.g., trip creation interface 702), presented on client device 130, where the GUI includes a trip identification field 704, a listing of previously submitted trip identifiers 706, a search field 708, and one or more search result presentation fields 710. The trip creation interface 702 may be configured as an interactive webpage or an interactive application screen (e.g., of the travel search machine 110) that allows a user to submit or select a trip identifier through either a text submission into trip identification field 704, or by selecting the desired trip identifier from among one or more trip identifiers listed in the listing 706.

The trip identification field 704 is shown receiving a trip identifier as a text submission (e.g., "Ski Trip"). The trip identification field 704 may be configured as a text input field that allows a user to input one or more characters, words, or phrases in order to define a trip data structure. Alternatively, should a user choose to access a previously generated trip data structure, the user may select the corresponding trip identifier from among the one or more trip identifiers within the listing 706 simply by clicking on the desired trip identifier. In some embodiments, the listing 706 may include one or more previously submitted trip identifiers, presented with one or more trip identifier attributes, including an author of the trip identifier, and a date which the trip identifier was added.

The search field 708 is shown as a text based input field, where a user may input one or more search criteria corresponding to a search query. In some embodiments the one or more search criteria may include a text input (e.g., words or phrases), predefined user preferences, geolocation information corresponding to the client device 130, as well as a user selection from among a list of one or more user selectable options (e.g., a list of departure locations, a list of arrival locations, times of day, dates, and a list of airlines). Upon receiving the one or more search criteria from the search field 708, the search module 204 may retrieve one or more corresponding search results based on the search criteria. The presentation module 206 may then cause the display of some or all of the search results within the search result presentation fields 710.

Figure 8:
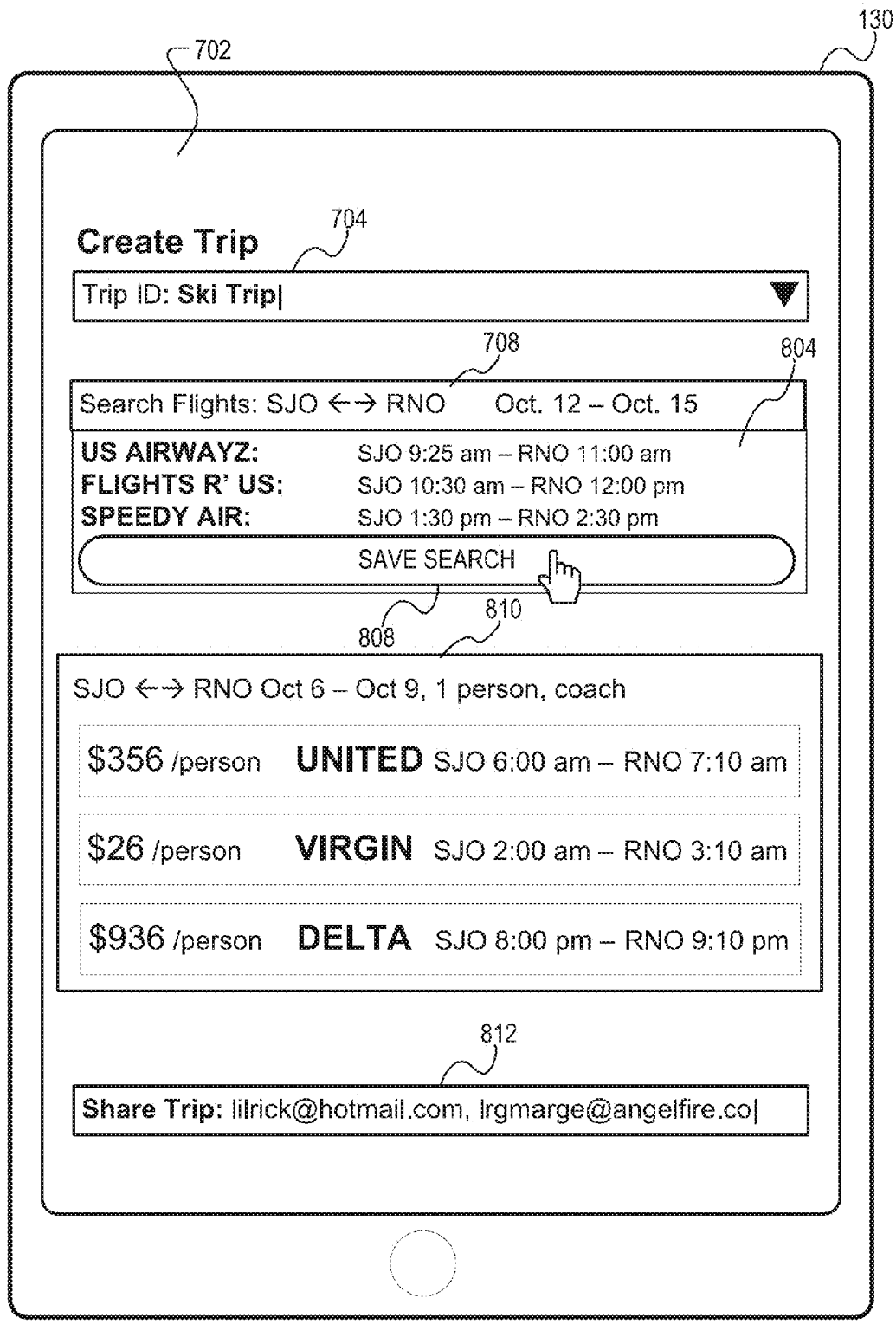
FIG. 8 is a diagram illustrating assignment of search results to a trip data structure, according to some example embodiments.

FIG. 8 is a diagram illustrating the trip creation interface 702, configured to assign the retrieved search results 804 to a trip data structure, according to some example embodiments. As noted above, the trip creation interface 702 may be configured as an interactive webpage or an interactive application screen, where search results 804 may be retrieved based on one or more search criteria (e.g., a departure location, an arrival location, a time, and a date) submitted into search field 708. In addition, prior search results 810 assigned to a trip identifier provided in the trip identification field 704 may also be displayed.

As in FIG. 7, the trip identification field 704 is shown receiving a trip identifier as a text submission (e.g., "Ski Trip") from a user through client device 130. In FIG. 8, search field 708 is shown to include one or more search criteria (e.g., a departure location, an arrival location, and a date) submitted by the user through client device 130. The travel search machine 110 retrieves search results 804 based on the one or more search criteria submitted. A user can save the retrieved search results 804 through the save search button 808. In some embodiments, clicking the save search button 808 links the retrieved search to the trip data structure identified by the trip identifier submitted in the trip identification field 704. As discussed above with reference to operation 306 of FIG. 3, the trip module 202 receives a command from client device 130 to assign the retrieved search results 804. The command may be submitted by clicking the save search button 808. The linking of the retrieved search results 804 may be performed by the trip module 202 generating a reference that identifies the trip data structure identified by the trip identifier (e.g., "Ski Trip"), and providing the reference to the search module 204 in order to store the reference within the search data structure corresponding to the search results 804. The search module 204 may also generate a reference that identifies the search data structure corresponding to the one or more search results 804 obtained based on the submitted search criteria, and may provide the reference to the trip module 202 in order to store the reference with the trip data structure identified by the trip identifier in the trip identification field 704.

The trip data structure identified by the submitted trip identifier in trip identification field 704 is shared with one or more additional users through the share trip field 812. The share trip field 812 is configured to receive contact information (e.g., a username, an email address, or phone number) belonging to one or more additional users to share the trip data structure identified by the submitted trip identifier with. In some embodiments the contact information may be provided as a text submission, as well as via selection of one or more contacts in a list of contacts. By sharing the trip data structure, the trip data structure and its corresponding search results 804 may be accessed by the additional identified users through, for example, client device 140. As shown, the share trip field 812 includes email addresses corresponding to additional users to share the generated trip data structure with.

Figure 9:
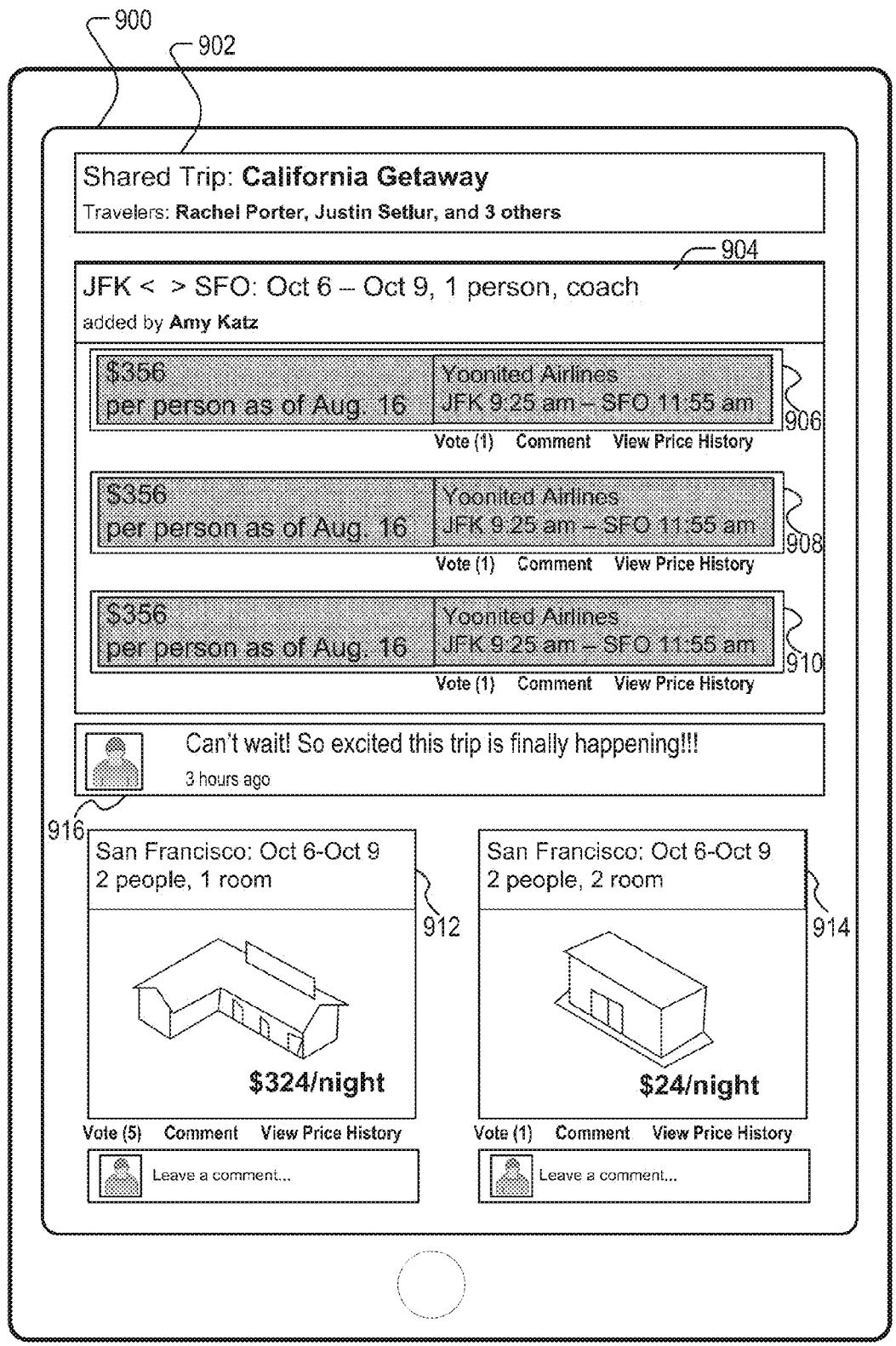
FIG. 9 is a diagram illustrating a shared results page including one or more search results as shareable trip objects, according to some example embodiments.

FIG. 9 is a diagram illustrating a shared trip interface 900 including a trip identifier 902, search criteria 904, one or more search results 906, 908, 910, 912, and 914, and a search comment 916, presented on one or more client devices (e.g., client device 130 and client device 140) according to some example embodiments.

As discussed above with reference to FIG. 7, the trip identifier 902 includes a trip identifier submitted by a user through trip identification field 704, or selected from among a list of previously submitted trip identifiers 706 (e.g., "California Getaway"). The trip identifier 902 may also include a list of travelers corresponding to the trip data structure identified by the trip identifier 902. As referenced in FIG. 8, the list of travelers may include one or more users as identified through the share trip field 812.

Figure 10:
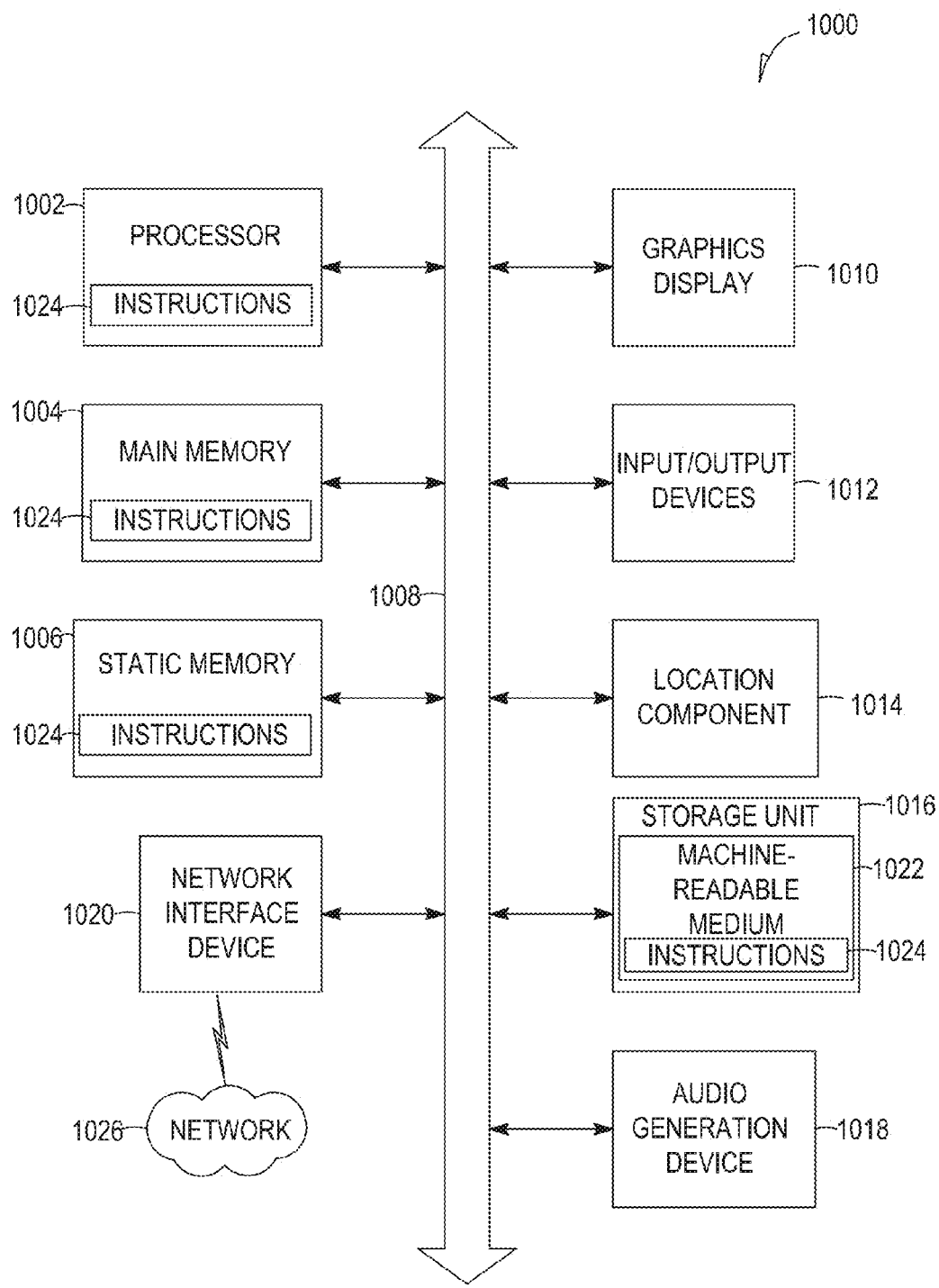
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions 1024 from a machine-readable medium 1022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 10 shows the machine 1000 in the example form of a computer system (e.g., a computer) within which the instructions 1024 (e.g., software, a program, an application, an applet, an app, or other executable code) for causing the machine 1000 to perform any one or more of the methodologies discussed herein may be executed, in whole or in part.

In alternative embodiments, the machine 1000 operates as a standalone device or may be communicatively coupled (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a PC, a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1024, sequentially or otherwise, that specify actions to be taken by that machine 1000. Further, while only a single machine 1000 is illustrated, the term "machine" shall also be taken to include any collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain solid-state digital microcircuits (e.g., electronic, optical, or both) that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein. In some example embodiments, the processor 1002 is a multicore computer processing unit (CPU) (e.g., a dual-core CPU, a quad-core CPU, or a 128-core CPU) within which each of multiple cores is a separate processor 1002 that is able to perform any one or more of the methodologies discussed herein, in whole or in part. Although the beneficial effects described herein may be provided by the machine 1000 with at least the processor 1002, these same effects may be provided by a different kind of machine 1000 that contains no processors 1002 (e.g., a purely mechanical system, a purely hydraulic system, or a hybrid mechanical-hydraulic system), if such a processorless machine 1000 is configured to perform one or more of the methodologies described herein.

The machine 1000 may further include a graphics display 1010 (e.g., a plasma display panel (PDP), a light emitting diode (LED) display, a liquid crystal display (LCD), a projector, a cathode ray tube (CRT), or any other display capable of displaying graphics or video). The machine 1000 may also include an input/output device 1012 (e.g., a keyboard or keypad, mouse, trackpad), a location component 1014 (e.g., a global positioning system (GPS) receiver), a storage unit 1016, an audio generation device 1018 (e.g., a sound card, an amplifier, a speaker, a headphone jack, or any suitable combination thereof), and a network interface device 1020.

The storage unit 1016 includes the machine-readable medium 1022 (e.g., a tangible and non-transitory machine-readable storage medium) on which are stored the instructions 1024 embodying any one or more of the methodologies or functions described herein. The instructions 1024 may also reside, completely or at least partially, within the main memory 1004, within the processor 1002 (e.g., within the processor's cache memory), within the static memory 1006, or all of the above, before or during execution thereof by the machine 1000. Accordingly, the main memory 1004 and the processor 1002 may be considered machine-readable media 1022 (e.g., tangible and non-transitory machine-readable media). The instructions 1024 may be transmitted or received over the network 1026 via the network interface device 1020. For example, the network interface device 1020 may communicate the instructions 1024 using any one or more transfer protocols (e.g., hypertext transfer protocol (HTTP)).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions 1024. The term "machine-readable medium" shall also be taken to include any medium, or combination of multiple media, that is capable of storing the instructions 1024 for execution by the machine 1000, such that the instructions 1024, when executed by one or more processors of the machine 1000 (e.g., processor 1002), cause the machine 1000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium 1022, as used herein, specifically does not include propagating signals per se. In some example embodiments, the instructions 1024 for execution by the machine 1000 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1024).

Certain embodiments are described herein as including logic or a number of components, modules, or mechanisms. Modules may constitute software modules (e.g., code stored or otherwise embodied on a machine-readable medium 1022 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1002 or a group of processors 1002) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a CPU or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a CPU configured by software to become a special-purpose processor, the CPU may be configured as respectively different special-purpose processors (e.g., each included in a different hardware module) at different times. Software (e.g., a software module) may accordingly configure one or more processors 1002, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1002 that are temporarily configured (e.g., by software) or permanently configured to perform the relevant operations. Whether temporarily or permanently configured, such processors 1002 may constitute processor-implemented modules that operate to perform one or more operations or functions described herein. Accordingly, the operations described herein may be at least partially processor-implemented, since a processor 1002 is an example of hardware. For example, at least some operations of any method may be performed by one or more processor-implemented modules. As used herein, "processor-implemented module" refers to a hardware module in which the hardware includes one or more processors 1002. Moreover, the one or more processors 1002 may also operate to support performance of the relevant operations in a "cloud computing" environment or as a "software as a service" (SaaS). For example, at least some of the operations may be performed by a group of computers (as examples of machines 1000 including processors 1002), with these operations being accessible via a network 1026 (e.g., the Internet) and via one or more appropriate interfaces (e.g., an application program interface (API)).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The performance of certain operations may be distributed among the one or more processors 1002, whether residing only within a single machine 1000 or deployed across a number of machines 1000. In some example embodiments, the one or more processors 1002 or hardware modules (e.g., processor-implemented modules) may be located in a single geographic location (e.g., within a home environment, an office environment, or a server farm). In other example embodiments, the one or more processors 1002 or hardware modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine 1000. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine 1000 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method including:
    receiving from a client device, via a network, an input that assigns a trip identifier to a trip data structure, the trip data structure comprising a list of user identifiers;
    accessing a search data structure that includes a set of search results generated based on a set of predefined preferences from a user account of a user associated with the client device;
    receiving a command from the client device to assign the set of search results to the trip identifier;
    linking the search data structure that includes the set of search results to the trip data structure identified by the trip identifier, based on the receiving of the command from the client device;
    causing display of a presentation of the trip identifier within a menu element that includes a display of one or more trip identifiers, the presentation of the trip identifier including an identification of the user account of the user associated with the client device;
    receiving a selection of the presentation of the trip identifier via the menu element;
    presenting an interface that includes the set of search results to one or more users identified by the list of user identifiers of the trip data structure in response to the selection of the presentation of the trip identifier, the interface including a rating interface to receive user inputs that comprise ratings based on numerical values to be assigned to the search data structure;
    receiving a numerical value to be assigned to the search data structure, as a user input into the rating interface; and
    presenting the numerical value as a rating of the search data structure displayed at a position within the interface that includes the set of search result based on the user input that includes the numerical value.

2. The method of claim 1, further including:
    receiving a second request from the user to view searches assigned to the trip identifier; and
    responsive to receiving the second request, presenting at least a portion of the search data structure linked to the trip data structure identified by the trip identifier to the first user.

3. The method of claim 1, wherein:
    the user is a first user; and the method further comprises:
    receiving a second request from a second user to view searches assigned to the trip identifier; and
    responsive to receiving the second request, presenting at least a portion of the search data structure linked to the trip data structure identified by the trip identifier to the second user.

4. The method of claim 1, wherein:
    the generating of the presentation causes the presentation to include at least one of the set of search criteria included in the search data structure.

5. The method of claim 1, wherein:
    the generating of the presentation causes the presentation to include at least one of the set of search results included in the search data structure.

6. The method of claim 1, further including:
    generating the search data structure by combining the set of search results and the set of search criteria.

7. The method of claim 1, wherein the obtaining of the trip identifier includes:
    causing presentation of a trip creation interface by the device of the user, the trip creation interface including a text field operable to accept the trip identifier as a submission of the user; and
    receiving the trip identifier as the submission from the device of the user.

8. The method of claim 1, wherein the obtaining of the trip identifier includes:
    causing presentation of a trip selection interface by the device of the user, the trip selection interface including a menu of trip identifiers among which is the trip identifier that identifies the trip data structure; and
    detecting selection of the trip identifier by the user via the menu within the trip selection interface.

9. The method of claim 1, wherein:
    the device of the user is a first device of a first user;
    the presentation is a first presentation of search results; and
    the method further comprises:
    receiving a search comment to be applied to the search data structure, the search comment corresponding to the set of search results and being received from the first device of the first user;
    storing the search comment in the search data structure; and
    causing a second presentation of search results to a second device of a second user, the second presentation including the search comment applied to the search data structure and at least a portion of the linked search data structure.

10. The method of claim 9, wherein the search comment to be applied to the search data structure includes at least one of a text string, a uniform resource identifier, an image, or a video.

11. The method of claim 1, wherein:
    the device of the user is a first device of a first user;
    the presentation is a first presentation of search results; and
    the method further comprises:

receiving a trip comment to be applied to the trip data structure, the trip comment corresponding to the trip identifier and being received from the first device of the first user;

storing the trip comment in the trip data structure; and causing a second presentation of search results to a second device of a second user, the second presentation including the trip comment and at least a portion of the trip data structure.

12. The method of claim 1, wherein:

the device of the user is a first device of a first user;

the presentation is a first presentation of search results; and the method further comprises:

receiving a search rating to be applied to the search data structure, the search rating corresponding to the set of search results and being received from the first device of the first user;

storing the search rating in the search data structure; and causing a second presentation of search results to a second device of a second user, the second presentation including the search rating and at least a portion of the search data structure.

13. The method of claim 1, wherein:

the device of the user is a first device of a first user;

the presentation is a first presentation of search results; and the method further comprises:

receiving a trip rating to be applied to the trip data structure, the trip rating corresponding to the trip identifier and being received from the first device of the first user;

storing the trip rating in the trip data structure; and causing a second presentation of search results to a second device of a second user, the second presentation including the trip rating and at least a portion of the trip data structure.

14. The method of claim 1, wherein:

the linking of the search data structure to the trip data structure identified by the trip identifier comprises:

generating a reference that identifies the trip data structure; and storing the reference that identifies the trip data structure in the search data structure.

15. The computer-implemented method of claim 1, wherein:

the linking of the search data structure to the trip data structure identified by the trip identifier comprises:

generating a reference that identifies the search data structure; and storing the reference that identifies the search data structure in the trip data structure.

16. A system comprising:

a processor; and a memory storing instructions that, when executed by the processor, causes the processor to perform operations comprising:

receiving, from a client device, via a network, an input that assigns a trip identifier to a trip data structure, the trip data structure comprising a list of user identifiers;

accessing a search data structure that includes a set of search results generated based on a set of predefined preferences from a user account of a user associated with the client device;

receiving a command from the client device to assign the set of search results to the trip identifier; and linking the search data structure that includes the set of search results to the trip data structure identified by the trip identifier;

causing display of a presentation of the trip identifier within a menu element that includes a display of one or more trip identifiers, the presentation of the trip identifier including an identification of the user account of the user associated with the client device, receiving a selection of the presentation of the trip identifier via the menu element;

presenting an interface that includes the set of search results to one or more users identified by the list of user identifiers of the trip data structure based on the selection of the presentation of the trip identifier, the interface including a rating interface to receive user inputs that comprise ratings based on numerical values to be assigned to the search data structure;

receiving a numerical value to be assigned to the search data structure, as a user input into the rating interface; and presenting the numerical value as a rating of the search data structure displayed at a position among the set of search results within the interface based on the user input that includes the numerical value.

17. The system of claim 16, wherein the instructions cause the system to perform operations further comprising:

receiving a second request to view the searches assigned to the trip identifier, the second request indicating the reference to the set of search results in the trip data structure; and based on the receiving the second request indicating the reference, presenting at least a portion of the searches assigned to the trip identifier.

18. A non-transitory machine-readable storage medium comprising instructions that, when executed by one or more processors of a machine, cause the machine to perform operations including:

receiving from a client device, via a network, an input that assigns a trip identifier to a trip data structure, the trip data structure comprising a list of user identifiers;

accessing a search data structure that includes a set of search results generated based on a set of predefined preferences from a user account of a user associated with the client device;

receiving a command from the client device to assign the set of search results to the trip identifier;

linking the search data structure that includes the set of search results to the trip data structure identified by the trip identifier, in response to the receiving of the command from the client device;

causing display of a presentation of the trip identifier within a menu element that includes a display of one or more trip identifiers, the presentation of the trip identifier including an identification of the user account of the user associated with the client device;

receiving a selection of the presentation of the trip identifier via the menu element;

presenting an interface that includes the set of search results to one or more users identified by the list of user identifiers of the trip data structure in response to the selection of the presentation of the trip identifier, the interface including a rating interface to receive user inputs that comprise ratings based on numerical values to be assigned to the search data structure;

receiving a numerical value to be assigned to the search data structure, as a user input into the rating interface; and presenting the numerical value as a rating of the search data structure displayed at a position within the interface that includes the set of search results based on the user input that includes the numerical value.

* * * * *